United States Patent
Kludy (10) Patent No.: US 10,915,702 B2
(45) Date of Patent: *Feb. 9, 2021

(54) METHODS AND SYSTEMS FOR VALIDATING MULTIPLE METHODS OF INPUT USING A UNIFIED RULE SET

(71) Applicant: Citrix Systems, Inc., Fort Lauderdale, FL (US)

(72) Inventor: Thomas M. Kludy, Cooper City, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/141,074

(22) Filed: Sep. 25, 2018

(65) Prior Publication Data

US 2019/0026261 A1 Jan. 24, 2019

Related U.S. Application Data (63) Continuation of application No. 14/147,306, filed on Jan. 3, 2014, now Pat. No. 10,114,811.

(60) Provisional application No. 61/825,330, filed on May 20, 2013.

(51) Int. Cl.
*G06F 16/24* (2019.01)
*G06F 40/174* (2020.01)

(52) U.S. Cl.
CPC ............ *G06F 40/174* (2020.01); *G06F 16/24* (2019.01)

(58) Field of Classification Search
CPC ..................................... G06F 40/174
USPC ........................................................ 707/694
See application file for complete search history.

(56) References Cited

U.S. PATENT DOCUMENTS

| | | | |
|---|---|---|---|
| 7,191,452 B2 | 3/2007 | Noden | |
| 8,527,366 B2 | 9/2013 | Jacob Sushil et al. | |
| 8,839,420 B2 | 9/2014 | Wibbeler | |
| 9,292,477 B1* | 3/2016 | Jesudoss | G06F 40/10 |
| 9,558,445 B1* | 1/2017 | Rabe | G06N 5/02 |
| 2003/0058277 A1 | 3/2003 | Bowman-Amuah | |
| 2005/0114673 A1 | 5/2005 | Raikar et al. | |
| 2007/0055866 A1 | 3/2007 | Lee | |
| 2008/0091780 A1* | 4/2008 | Balan | H04L 63/0428 709/204 |
| 2008/0256612 A1* | 10/2008 | Roy | H04L 63/12 726/5 |
| 2009/0150677 A1 | 6/2009 | Vedula et al. | |
| 2011/0125827 A1 | 5/2011 | Ramanathan et al. | |

(Continued)

FOREIGN PATENT DOCUMENTS

| | | |
|---|---|---|
| CN | 102696036 A | 9/2012 |
| EP | 1 739 873 A1 | 1/2007 |
| WO | WO-2011/062742 A2 | 5/2011 |

OTHER PUBLICATIONS

Notice of Reexamination in CN Appl. No. 201480041220.7, dated Oct. 29, 2019.

(Continued)

*Primary Examiner* — Kuen S Lu
(74) *Attorney, Agent, or Firm* — Foley & Lardner LLP (57) ABSTRACT

A system and methods for validating input data acquired through an interactive or non-interactive source. The system includes a common definition of input validation rules, and the capability of validating input without committing the input to the system.

18 Claims, 8 Drawing Sheets

(56) References Cited

U.S. PATENT DOCUMENTS

2013/0007240 A1     1/2013   Qiu et al.
2013/0067309 A1     3/2013   Chokshi

OTHER PUBLICATIONS

Decision of Rejection in CN Appl. No. 201480041220.7, dated Dec. 24, 2018.
EP Examination Report for EP Patent Application No. 14800540.8, dated Dec. 8, 2017.
Extended European Search Report for European Patent Application No. EP 14 80 0540, dated Mar. 3, 2017.
Final Office Action for U.S. Appl. No. 14/147,306, dated Feb. 25, 2016.
Final Office Action for U.S. Appl. No. 14/147,306, dated May 25, 2017.
First Chinese Office Action received in Chinese Application No. 201480041220.7, dated Nov. 3, 2017.
International Search Report and Written Opinion for PCT Application No. PCT/US2014/010242, dated Apr. 30, 2014.
Non-Final Office Action for U.S. Appl. No. 14/147,306, dated Aug. 25, 2015.
Non-Final Office Action for U.S. Appl. No. 14/147,306, dated Jan. 20, 2017.
Notice of Allowance for U.S. Appl. No. 14/147,306, dated Jun. 22, 2018.
Second Chinese Office Action received in Chinese Application No. 201480041220.7, dated Aug. 9, 2018.

\* cited by examiner

METHODS AND SYSTEMS FOR VALIDATING MULTIPLE METHODS OF INPUT USING A UNIFIED RULE SET

CROSS-REFERENCE TO RELATED APPLICATIONS

This patent application is a continuation of, and claims priority to and the benefit of U.S. patent application Ser. No. 14/147,306, titled "METHODS AND SYSTEMS FOR VALIDATING MULTIPLE METHODS OF INPUT USING A UNIFIED RULE SET," and filed Jan. 3, 2014, which claims priority to and the benefit of U.S. Provisional Patent Application No. 61/825,330, titled "METHODS AND SYSTEMS FOR VALIDATING MULTIPLE METHODS OF INPUT USING A UNIFIED RULE SET," and filed May 20, 2013, the contents of all of which are hereby incorporated herein by reference in its entirety for all purposes.

BACKGROUND

A system (such as a web application server) can accept user input through a number of components, such as through user interfaces or application programming interfaces (APIs). Validating this user input ensures that this input matches an application's data model to help protect application data from user input mistakes and from users who have malicious intent. For example, validation can occur when a user enters input into an online form having several fields. One or more of these fields can require, for example, a certain format or a set number of alphanumeric characters. If the user's input does not meet the specified requirements for that field, that input would be considered invalid.

In such an environment, there are many ways to incorporate input validations. These input validations can be independently implemented across multiple components of the system. When input validation rules are independently implemented across multiple components, inconsistencies in validation can result.

BRIEF DESCRIPTION OF THE DRAWINGS

Reference will now be made to the accompanying drawings showing example embodiments of this disclosure. In the drawings.

DETAILED DESCRIPTION

A system that accepts input through a user interface, an API, and other methods can require multiple independent methods for validating that input.

For instance, one way for entering input is when a user provides interactive input by entering data into a user interface. In such a scenario, the user may expect immediate feedback on the input being entered into a field when a mistake is made. For example, if the user enters a number that is out of range, leaves a required field blank, or provides a user name that is already in use, the user may desire an immediate error notification. The changes being made to the user interface in this scenario can be transient, and may not be saved until the user explicitly requests for the changes to be saved or submitted. Performing validation as close to the user as possible is advantageous, because every extra network communication between user input and validation rule evaluation can result in increased lag between the invalid input and, for example, showing the error messages to the user.

In another example, entering input can also involve committing input to make changes to the data stored in the system. This can occur, for example, when submitting a form. In this scenario, the entire set of input spanning multiple fields can be validated as a whole. The validation errors, if they occur, can be shown next to the fields where the errors were found, allowing a user to correct the errors before attempting to commit the input again.

In another example, input is acquired by way of non-interactive methods such as when a user calls an API directly. In such a scenario, the user may expect to receive a full report of all invalid inputs as a result of calling the API. In this example, when input that is submitted to the system is determined to be invalid, that input is not committed to the system.

Some exemplary systems are complex and can have components implemented using multiple different technologies that can share data, but not implementation. For example, the API for accessing the data can be implemented using C#, while the user interface can be implemented using JavaScript. In some embodiments, input validation can be performed using an approach that unifies the validation rules that can be executed by different components where the different components are implemented using different technologies.

In another example, an API can provide default values for some properties, and those default values can influence validation. In some embodiments, callers of the API (including, for example, a user interface and other intermediate layers) acquire the default values to ensure that the user can enter data that will validate successfully.

Embodiments consistent with the present disclosure allow validation rules to be implemented in one component, using one technology, while still allowing for those validation rules to be applied in multiple components and in multiple input methods for receiving and validating input.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

Figure 1:
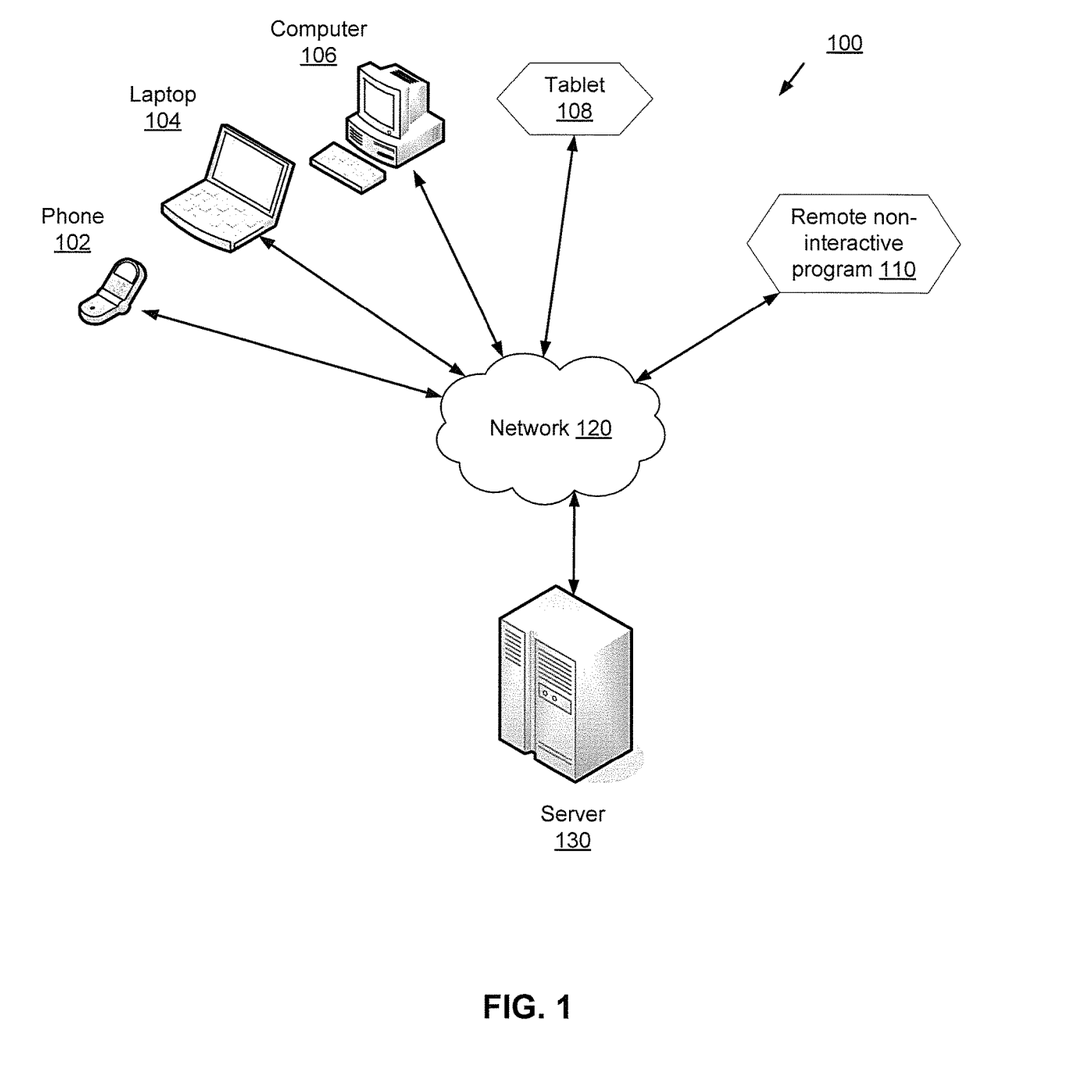
FIG. 1 is a block diagram of an exemplary system, consistent with embodiments of the present disclosure.

FIG. 1 is a block diagram of an exemplary networked system 100. Exemplary system 100 can be any type of system validating input data and transmitting that data over a network 120. Input data can come from any remote input source, including interactive devices such as, for example, a phone 102, a laptop 104, a computer 106, or a tablet 108. Input data can also come from non-interactive sources, such as, for example, any remote program without a graphical user interface (GUI), including a remote non-interactive program 110, or a remote daemon or automatically scheduled program (not shown). In system 100, input data is conveyed from input sources via network 120 to and from server 130. Server 130 can involve one or more machines comprising one or more processors (not shown) and a memory. The one or more processors can be single or multiple microprocessors, field-programmable gate arrays (FPGAs), or digital signal processors (DSPs) capable of executing particular sets of instructions stored in the memory. The memory includes a tangible nontransitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory.

Figure 2:
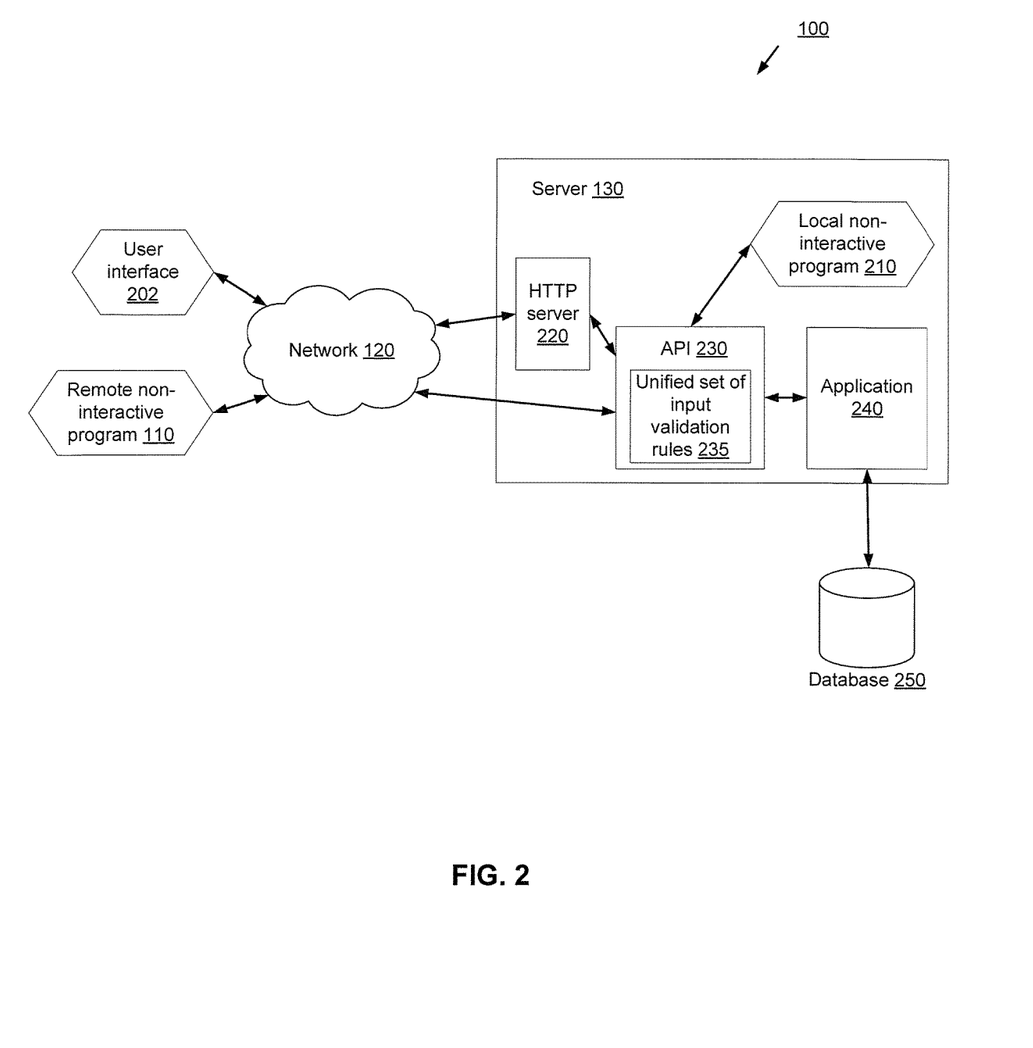
FIG. 2 is an exemplary block diagram of the exemplary system of FIG. 1, consistent with embodiments of the present disclosure.

FIG. 2 is an exemplary block diagram of exemplary system 100, illustrating types of components and exemplary communication flows within the system. In this exemplary block diagram, system 100 can accept input via an interactive user interface 202 such as, for example, the interfaces of interactive devices 102, 104, 106, or 108. System 100 can also accept input from a remote non-interactive program 110 (or any other non-interactive source, such as a program without a GUI, remote command-line program, or a remote daemon or automatically scheduled program). In some embodiments, exemplary system 100 can accept input from a local interactive or non-interactive program, such as, for example, local non-interactive program 210, such that no input is conveyed from the local program via network 120.

In some embodiments, server 130 includes an HTTP server 220. While FIG. 2 refers to HTTP server 220, it is appreciated that server 130 can include any type of data server such as, for example, a web server, an FTP server, an application server, a database server, a media server, a cloud server, and/or a mail server. In some embodiments, HTTP server 220 accepts input and transmits data via network 120 to and from user interface 202 and/or remote non-interactive program 110.

In some embodiments, server 130 includes local non-interactive program 210 (or any other local non-interactive source, such as a daemon or non-GUI program) that provides input and accesses unified set of input validation rules 235 via API 230.

Server 130 includes an API 230, which is an entry point where data is read from system 100 and where changes to data are submitted. API 230 includes a definition of unified set of input validation rules 235 used by system 100. In some embodiments, unified set of input validation rules 235 can be defined outside of API 230. The API entry point can be used by HTTP server 220 (or any other local data server) and by any non-interactive program (such as remote non-interactive program 110 or local non-interactive program 210) or a local interactive program (not shown).

API 230 provides an interface to application 240, which can access and commit data to database 250. In some embodiments, application 240 does not read from and/or commit data to any databases. Database 250 can be local to application 240, or can be located on a remote machine. Application 240 can be any program or group of programs that processes input.

In some embodiments, HTTP server 220 can be part of a local software framework that includes functions that transform one or more rules in unified set of input validation rules 235 into local, component-specific implementations of the one or more rules using a common technology. For example, in some embodiments, a .Net-based HTTP server can interact with local methods in C# that access unified set of input validation rules 235 via API 230, and use unified set of input validation rules 235 to parameterize C# implementations of input validation rules that are thus based on and consistent with unified set of input validation rules 235. Those C# implementations of the input validation rules can in turn be used to generate JavaScript implementations of the input validation rules that are embedded in the web page code that will in turn be rendered by a web browser on a remote device.

Figure 3A:
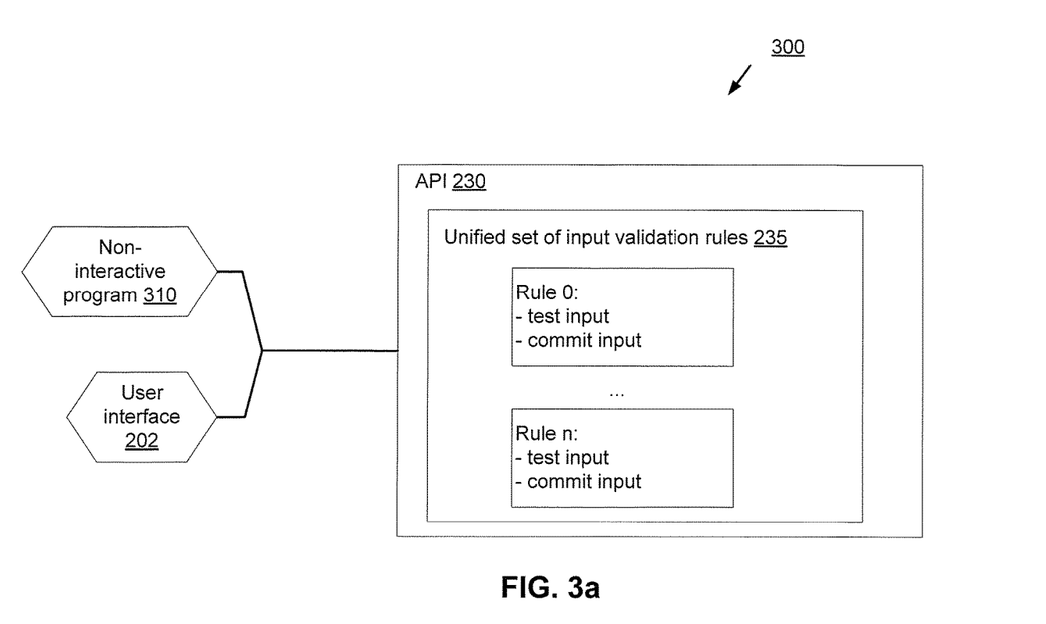
FIGS. 3*a* and 3*b* are diagrams illustrating exemplary approaches for defining validation rules, consistent with embodiments of the present disclosure.
Figure 3B:
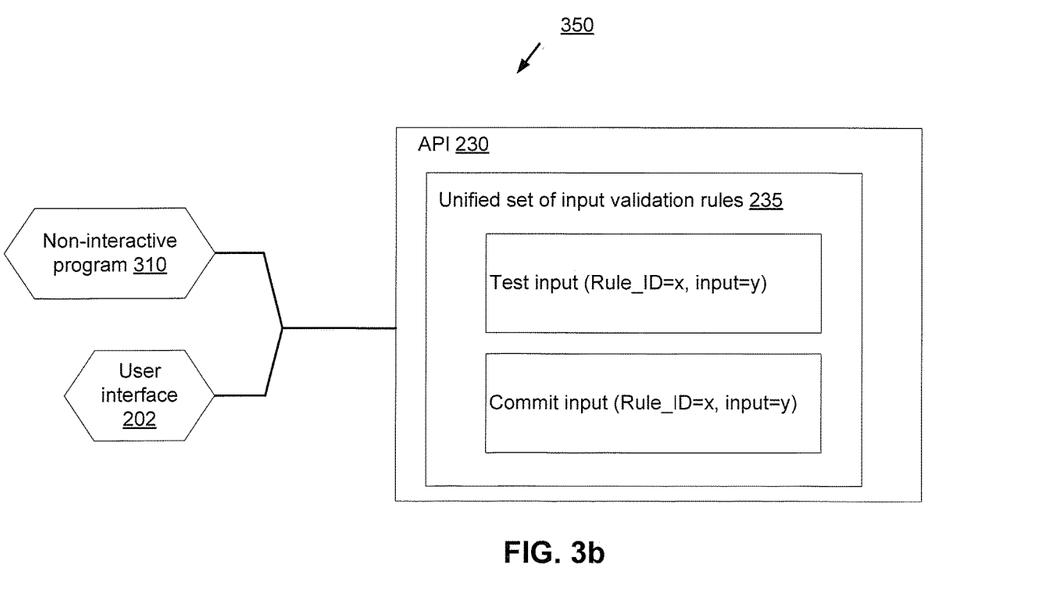

FIGS. 3a and 3b are diagrams illustrating exemplary approaches for defining unified set of input validation rules 235. Unified set of input validation rules 235 can be any one or more of a set of validation rules that can be applied to an input value, including, for example: minimum and maximum values, minimum and maximum string length, required regular expression pattern that the input value must match, whether the input value is required to be specified or is only optional, or any special rule that must be validated by the API itself. A special rule can be, for example, a determination of whether a user exists in Microsoft Windows' Active Directory. Each rule in unified set of input validation rules 235 can be specified to validate on "commit" or on both "commit" and "interactive input." Each rule can evaluate one or more of the input properties and returns zero or more errors. The evaluation of the rule can involve running a local implementation of that rule and/or making a call upward to a parent implementation at another component or API. Each error can describe the input limitation that was violated, and can refer to all input properties that contributed to the error condition.

In exemplary approaches 300 and 350, input from any interactive source, such as user interface 202, or non-interactive source, such as non-interactive program 310, can be evaluated against the rules defined in unified set of input validation rules 235. Command line program 310 can be local or remote. Unified set of input validation rules 235 can be defined in any architecture as long as API 230 can provide one or more methods for providing the rule; testing whether the input satisfies the rule; and committing the input. In some embodiments, API 230 can further provide methods for providing the default value for the rules, if any.

Figure 4:
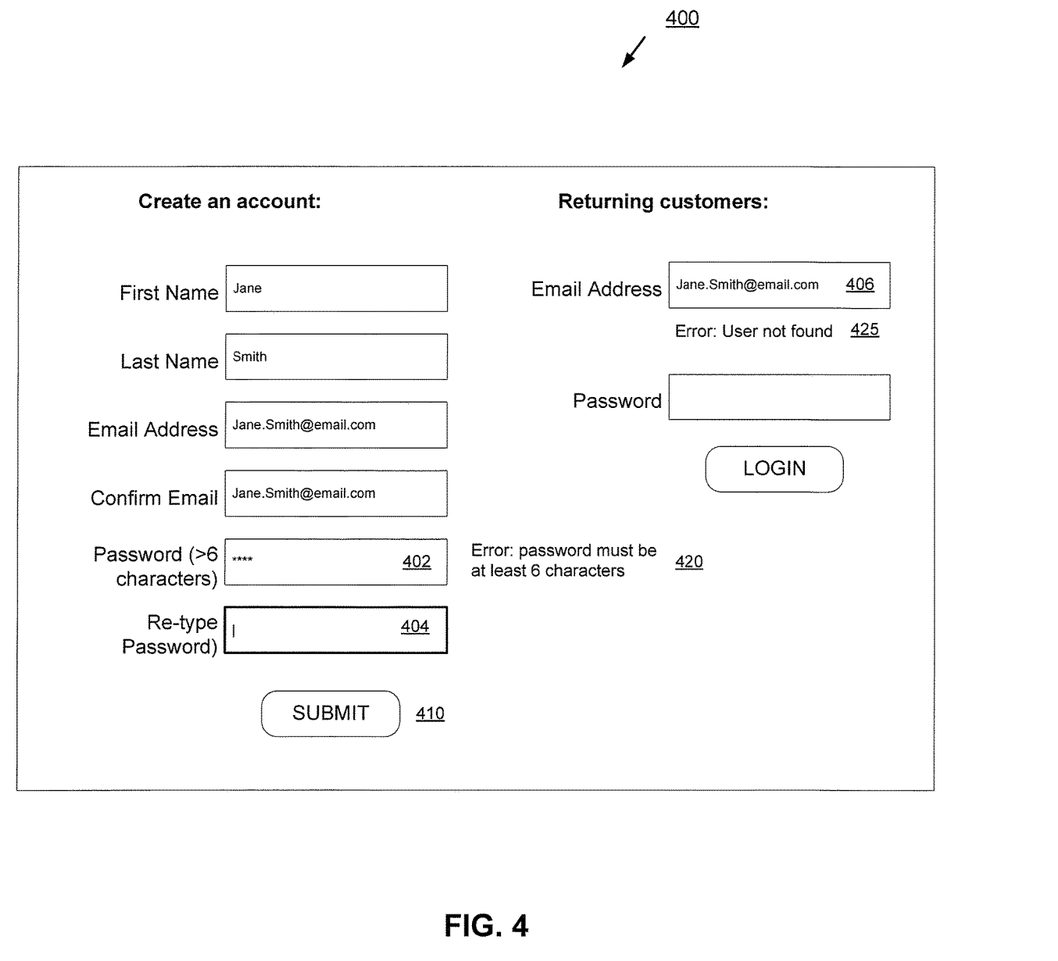
FIG. 4 is an exemplary graphical user interface for interactively entering input, consistent with embodiments of the present disclosure.

In some embodiments, unified set of input validation rules 235 are used to generate some of the features of the GUI, such as the exemplary GUI provided in FIG. 4. For example, component-specific implementations of unified set of input validation rules 235 can be used to validate an input value in each field. In some embodiments, validation is local to the GUI. For example, where the validation rule is simple, the rule—by way of the component-specific implementation—can be entirely executed in the graphical interface, without requiring a call to server 130. This can be advantageous, because any errors can be expediently reported to the user, without any delay from accessing server 130. For instance, exemplary GUI 400 provides fields that accept strings. Field 402 is associated with at least one relevant validation rule in unified set of input validation rules 235: that is, it accepts a string that must be greater than 6 characters in length. In the display in exemplary GUI 400, the user has entered a string that is only four characters long and moved on to field 404. Because testing the length of a string is very simple, a JavaScript implementation of the relevant validation rule in unified set of input validation rules 235 can be used to execute the rule and provide a visual indication of the error 420 as soon as the user's focus has exited field 402.

Field 406 in graphical user interface 400 can involve a different set of unified set of input validation rules 235. For instance, input received via field 406 can be validated using a simple regular expression to ensure that the input text appears to be a valid email address—for example, a test for one and only one '@' character. This scenario is another example of validation that is local to the GUI, as with field 402, and thus a JavaScript implementation of the relevant rule in unified set of input validation rules 235 can be used to provide a visual indication of the error as soon as the user's focus has exited field 406.

The input received via field 406 can also involve remote validation, such as a function call to HTTP server 220 to test whether the input matches an email address in a user database (such as a user database in database 250 in exemplary system 100). For example, the call to HTTP server 220 can in turn call a relevant function in unified set of input validation rules 235 via API 230, which can handle the test for whether the input value matches an email address in the user database. In some embodiments, this remote validation can require reloading the entire page (here, the exemplary GUI 400). In some embodiments, the call to HTTP server 220 is mediated by, for example, AJAX, and any error relating to failure of the remote validation can be used to provide a visual indication of the error 425 as soon as possible after the user's focus has exited field 406, without reloading the page.

Exemplary GUI 400 can also include a submit button 410. Submit button 410 is an interface unit allowing the user to attempt to commit input entered via a set of associated input fields. In some embodiments, when a user selects submit button 410, all of the input received via the associated input fields will be validated using a call to unified set of input validation rules 235 via API 230, and the input can be committed if there are no errors. In some embodiments, the user will be unable to select submit button 410 if an error has already been detected in any of the associated input fields using local or remote validation. In such an embodiment, the user will be able to select submit button 410 after correcting the error by editing the input in the corresponding field.

Figure 5:
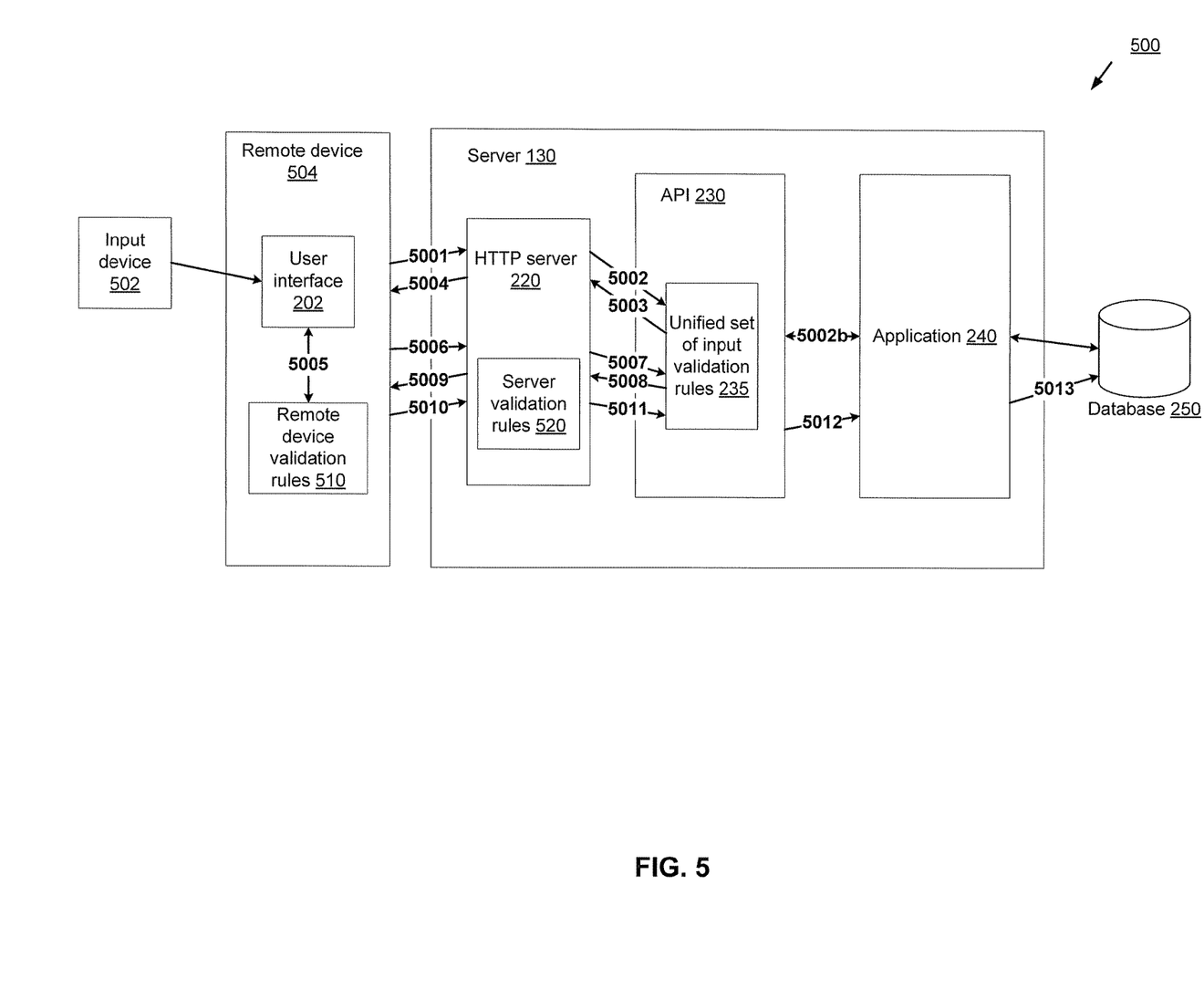
FIG. 5 is a block diagram showing exemplary data communication flows for interactive input and validation in the exemplary system of FIG. 2, consistent with embodiments of the present disclosure.

FIG. 5 is a block diagram showing exemplary data communication flows for interactive input and validation in exemplary system 100 of FIG. 2, consistent with embodiments of the present disclosure. Exemplary system 100 can include a remote device 504. Remote device 504 can be any type of device that accepts input, such as phone 102, laptop 104, computer 106, or tablet 108. In some embodiments, input can be accepted by way of a separate input device 502, such as, for example, a keyboard or stylus.

Remote device 504 can include user interface 202. User interface 202 can take the form of, for example, a page in a web browser or exemplary graphical user interface 400. In some embodiments, user interface 202 uses an interactive command-line interface. Remote device 504 can include remote device validation rules 510. Remote device validation rules 510 are an implementation of one or more rules from unified set of input validation rules 235 that are local to remote device 504, such as the component-specific implementations of unified set of input validation rules 235 in connection with exemplary GUI 400. In such a scenario, one or more relevant rules from unified set of input validation rules 235 can be implemented in a high-level scripting language, such as, for example, JavaScript, Ruby, or PHP. In some embodiments, remote device validation rules 510 can be executed in remote device 504—for example, in a web browser without a call to HTTP server 220 or API 230. For example, in the display in exemplary GUI 400, the user has entered a string that is only four characters long and has moved on to field 404. Because testing the length of a string is very simple, a JavaScript implementation of the relevant validation rule (for example, an implementation using jQuery-validate) in unified set of input validation rules 235 can be used to execute the rule and provide a visual indication of the error 420 as soon as the user's focus has exited field 402.

Server 130 can include a data server such as HTTP server 220. Server 130 can further include server validation rules 520, where HTTP server 220 and server validation rules 520 are implemented using the same application framework, such as .Net or J2EE. Moreover, in some embodiments, server validation rules 520 can be implemented within the data server. In some embodiments, server validation rules 520 and HTTP server 220 are implemented using the same application frameworks or programming languages. In some embodiments, server validation rules 520 and HTTP server 220 are implemented using different application frameworks or programming languages.

API 230 includes unified set of input validation rules 235 used by exemplary system 100. The unified rule set includes two or more subsets of validation rules, where subset membership is based in part on where those rules are executed. For example, the unified rule set could include a first subset of validation rules where execution of the rules occurs at API 230, a second subset of validation rules where execution of the rules occurs at the data server (e.g., HTTP server 220), and a third subset of validation rules where execution of the rules occurs at remote device 504.

It can be appreciated that any number of component-specific implementations of unified set of input validation rules 235 can be created. It can be further appreciated that each component-specific implementation should inherit a definition of the validation rules from a lineage of component-specific implementations that traces back to API 230, such that all component-specific implementations can enforce validation rules according to a common rule set as defined in unified set of input validation rules 235. A validation rule is executed when the actual logic of the rule is evaluated by a particular implementation, as distinguished from an implementation of the rule that merely calls upward to a parent implementation of the rule—for example, where a JavaScript statement calls upward to a function at server validation rules 520. Examples of component-specific implementations include, for example, remote device validation rules 510 and server validation rules 520. For example, one subset of validation rules could be the input validation rules that can be executed in, for example, a C# implementation as server validation rules 520, and another subset of validation rules could be those input validation rules that can be executed in, for example, a JavaScript implementation as remote device validation rules 510. In some embodiments, where an input validation rule must be executed by a method provided by API 230 (that is, it will not be "understood" by, for example, a JavaScript implementation of the rule executed at remote device 504 or a C# implementation of the rule executed at HTTP server 220), the component-specific implementation of the rule (in, for example, server validation rules 520 or remote device validation rules 510) can comprise a call, implemented in the component-specific language to API 230 (e.g., a C# or JavaScript call) to execute the relevant rule in unified set of input validation rules 235.

It can be appreciated that input values to be validated can be received from a component-specific implementation. It can be further appreciated that input could have been provided to a component-specific implementation for validation, and that component-specific implementation can be capable of executing all remaining relevant input validation rules to completely validate the input. In some embodiments, a component-specific implementation can provide the input to a parent implementation of the validation rule in order to complete the validation of the input values, and in some embodiments, the input values can be provided to parents until the input values are completely validated via API 230. Thus, validation of input can proceed in a tiered fashion, such that, in some embodiments, validation of input is handled by the child component-specific implementations to the extent relevant validation rules can be executed by that component. This can be advantageous, because as described in exemplary system 100, users can interact with a user interface 202 that directly interacts with a child component-specific implementation (e.g., remote device validation rules 510), and in some circumstances a user's experience can be improved when validation is performed as close to the user as possible.

API 230 provides an interface to application 240, which can access and commit data to database 250. In some embodiments, application 240 does not read from and/or commit data to any databases. Database 250 can be local to application 240, or can be located on a remote machine. Application 240 can be any program or group of programs that processes input.

In an example of how interactive input data can be handled by exemplary system 100, the following events can occur. Prior to performing validation, a remote device 504 can request access to user interface 202, such as a web page, from HTTP server 220 (5001). This request for accessing user interface 202 can be based on a user entering information about that webpage through input device 502 and/or remote device 504. Moreover, this request can include information identifying the user interface to be provided to remote device 504, such as, for example, a URL or web page address, or other information for identifying particular user interface 202 for receiving input data for exemplary system 100. Remote device 504 can access any kind of user interface 202 that can be used to deliver input, directly or indirectly, to API 230.

After receiving the request from remote device 504, HTTP server 220 accesses API 230 using information from that request (5002). API 230 can then provide information to and obtain information from one or more applications (such as application 240) (5002b), which can also communicate with one or more databases (such as database 250) for acquiring the information.

API 230 provides validation rules for each relevant parameter that can be accepted by application 240, as defined in unified set of input validation rules 235 (5003). In some embodiments, the information passed from API 230 to HTTP server 220 can also include default values. Moreover, in some embodiments, only the downward validation rules (in this case, server validation rules 520 and remote device validation rules 510) are provided by API 230. In some other embodiments, all rules of unified set of input validation rules 235 are provided by the API, regardless of where the validation rules are validated.

The validation rules from unified set of input validation rules 235 can be used to parameterize server validation rules 520 and/or to generate web page code. For example, in some embodiments, a .Net-based HTTP server 220 can interact with local methods in C# that access unified set of input validation rules 235 via API 230, and use unified set of input validation rules 235 to parameterize C# implementations of input validation rules that are thus based on and consistent with unified set of input validation rules 235. Those C# implementations of the input validation rules can in turn be used to generate JavaScript implementations of the input validation rules (such as remote device validation rules 510) that are embedded in the web page code that will in turn be rendered by a web browser on a remote device 504. In some embodiments, the default values provided by API 230 can also be used to parameterize server validation rules 520 and/or to generate web page code.

In some embodiments, one or more subsets of input validation rules 235 can be used to parameterize server validation rules 520 and/or to generate web page code. For example, in some embodiments, a .Net-based HTTP server 220 can interact with local methods in C# that access unified set of input validation rules 235 via API 230, and use one or more subsets of unified set of input validation rules 235 to parameterize C# implementations of input validation rules that are thus based on and consistent with unified set of input validation rules 235. One or more portions of the C# implementations of the one or more subsets of input validation rules 235 can in turn be used to generate JavaScript implementations of the input validation rules (such as remote device validation rules 510) that are embedded in the web page code that will in turn be rendered by a web browser on a remote device 504. A portion of a set of input validation rules can be any subset of the set of input validation rules.

As stated previously, unified set of input validation rules 235 can include two or more subsets of validation rules, where subset membership is based in part on where those rules are executed. Using the example above, one subset of validation rules would be the input validation rules that can be executed in, for example, a C# implementation as server validation rules 520 and another subset of validation rules would be those input validation rules that can be executed in, for example, a JavaScript implementation as remote device validation rules 510. In some embodiments, where an input validation rule must be executed by the API (that is, it will not be "understood" by, for example, a JavaScript implementation of the rule executed at remote device 504), the component-specific implementation of the rule (in, for example, server validation rules 520 or remote device validation rules 510) can comprise a call, implemented in the component-specific language to API 230 (e.g., a C# or JavaScript call) to execute the relevant rule in unified set of input validation rules 235.

After receiving the input validation rules from API 230 (5003), HTTP server 220 can store those validation rules, as integrated into server validation rules 520, for future validations. In some embodiments, HTTP server 220 can store received default values.

Default values can include, for example, a simple value or a calculated default. A simple value default can be, for example, the default number of sessions per server, where the value is an integer such as 250. A calculated default can be, for example, an instruction to look for a license server at the address "http://license.[DNS suffix]", where the DNS suffix may not itself have a set default value. In the calculate-default example, the default license server address can be presented to the user in the form of a text box that is updated once that user edits a different text box.

HTTP server 220 provides the web page code, along with remote device validation rules 510, to remote device 504 (5004). Remote device validation rules 510 can be stored for later validations of input values provided by user interface 202. Remote device validation rules 510 can be, for example, JavaScript implementations of input validation rules that were generated using the validation rules provided in step 5003 and/or the server validation rules 520. Remote device validation rules 510 can also be based on default values provided in step 5003 and/or the server validation rules 520. Examples of validation rules that can be included in a subset of validation rules where execution of the rules occurs at remote device 504 include, for example, evaluating whether input satisfies minimum and maximum values, minimum and maximum string length, required regular expression pattern that the input value must match, and whether the input value is required to be specified or is only optional.

An example of a validation rule that can be included in a subset of validation rules where execution of the rules occurs at an intermediate component, such as server validation rules 520, is validating an IP address. For example, application 240 can accept an "IP address" parameter, and one relevant input validation rule in unified set of input validation rules 235 can be determining whether the input value is a valid IPv6 address. This validation may not be executed by a simple pattern match (that, for example, can be suitably implemented in JavaScript), and can require complex logic that can be suitably implemented in a lower-level language such as C# or C. Moreover, the determination may not require access to data that is only available to API 230. This validation rule can be implemented in remote device validation rules 510 as a JavaScript call to server validation rules 520 to validate an IP address, which can be mediated by HTTP server 220. In such circumstances, execution of the relevant input validation rule can occur in a component-specific implementation at server validation rules 520, without a call to API 230.

An example of a validation rule that can be included in a subset of validation rules where execution of the rules occurs at API 230 is determining whether a user exists in Microsoft Windows' Active Directory. This validation rule can be implemented in remote device validation rules 510 as a JavaScript call to API 230 to search Active Directory, which can be handled by intermediate components such as HTTP server 220 using server validation rules 520. Thus for example, there can be an implementation of the rule in remote device validation rules 510, but the rule is not executed there; rather, it is executed via API 230.

Next, user interface 202 renders the web page code provided in step 5004. For example, user interface 202 could render GUI 400 of FIG. 4. User interface 202 can accept one or more input values from the user, for example, the input values entered into the fields of GUI 400. The one or more input values received by user interface 202 can be validated using remote device validation rules 510 specified by the one or more rules of unified set of input validation rules 235. For example, as shown in FIG. 4 above, a field can require a number of characters greater than a threshold value. The number of characters for that field can be evaluated based on remote device validation rules 510. If the required number of characters are not provided to that field, according to remote device validation rules 510, user interface 202 can display an error message (such as error message 420).

In general, it is advantageous to validate input data as close to the user as possible. Exceptions to this general principle can occur, for example, where the user requests to commit the input, and one or more input values require remote validation; thus, it can be more efficient to validate all input at the same time via remote validation. Where the relevant one or more rules in unified set of input validation rules 235 can be executed by remote device validation rules 510, inputs can be validated at remote device 504 (5005) without an upward call to, for example, HTTP server 220 or API 230.

Where the relevant one or more rules in unified set of input validation rules 235 cannot be entirely executed in remote device validation rules 510 (that is, for example, those rules that are not understood at that component), the rule implementation in remote device validation rules 510 can call one or more rules in server validation rules 520 (5006) or in API 230. For example, as shown above in FIG. 4, server validation rules 520 can be called to determine whether an email address is in a database. If any errors occur based on server validation rules 520, HTTP server 220 can send an error notification to remote device 504 for providing a visual indication of the error 425. Displaying an error notification allows a user to correct any error before any input values are committed to application 240.

Where the relevant one or more rules in unified set of input validation rules 235 cannot be executed (with respect to the received input values) in server validation rules 520, server validation rules 520 can call one or more rules in unified set of input validation rules 235 via API 230 (5007). For example, where the relevant rule is determining whether a user exists in Microsoft Windows' Active Directory, the rule can have an implementation in server validation rules 520—that is this validation rule can be implemented in C# as a call to API 230 to search Active Directory. Thus, in this example, there is an implementation of the rule in server validation rules 520, but the rule is not executed there; rather, it is executed via API 230.

In some embodiments, if the relevant one or more rules in unified set of input validation rules 235 can be executed in server validation rules 520, server validation rules 520 can provide errors, if any, to remote device 504, without following steps 5007 and 5008. For example, application 240 can accept an "IP address" parameter, and one relevant input validation rule in unified set of input validation rules 235 can be determining whether the input value is a valid IPv6 address. This validation may not be executed by a simple pattern match (that, for example, can be suitably implemented in JavaScript), and can require complex logic that can be suitably implemented in a lower-level language such as C# or C++. Moreover, the determination may not require access to data that is only available to API 230. In such circumstances, evaluation and execution of the relevant input validation rule can occur in a component-specific implementation at server validation rules 520, without a call to API 230.

After the input value has been evaluated by the relevant validation rules in unified set of input validation rules 235, errors, if any, will be provided to server validation rules 520 (5008). It will be appreciated that if HTTP server 220 accessed the relevant validation rules in unified set of input validation rules 235 in step 5006, errors, if any, can be provided to HTTP server 220. Errors responsive to the call in step 5006, if any, can then be provided to remote device 504 (5009), and resulting error messages can be displayed in user interface 202 as appropriate.

The user can then edit the input values as needed via user interface 202, and can choose to submit the one or more input values. After receiving the input values, remote device 504 can evaluate the input values using remote device validation rules 510. If the input values are valid, remote device 504 can submit the input values to server 130 for validation (5010). If, however, the input is not valid (i.e., one or more remote device validation rules returns an error when given that input value), the user may not be able to submit the input value to server 130. For example, user interface 202 can deactivate submit button 410. The user can then have the option to correct the error before attempting to submit the input values.

After receiving the input values from remote device 504, HTTP server 220 can determine whether the input values are valid via server validation rules 520. If valid, the input values can be provided to API 230 for validation using any remaining relevant rules from unified set of input validation rules 235 (5011). If valid based on the remaining relevant rules, the input can be provided to application 240 (5012) and then committed to database 250 (5013).

While FIG. 5. refers to a set of remote device validation rules 510 and a set of server validation rules 520, it is appreciated that any number of tiered layers—each including implementations of one or more rules from unified set of input validation rules 235—can provide input validation using a unified rule set and can further include default values derived from unified set of input validation rules 235.

When errors are generated by any of the various implementations of the validation rules, default values for the parameters can be updated, and error messages can be used to guide the user to correct the error in user interface 202.

Figure 6:
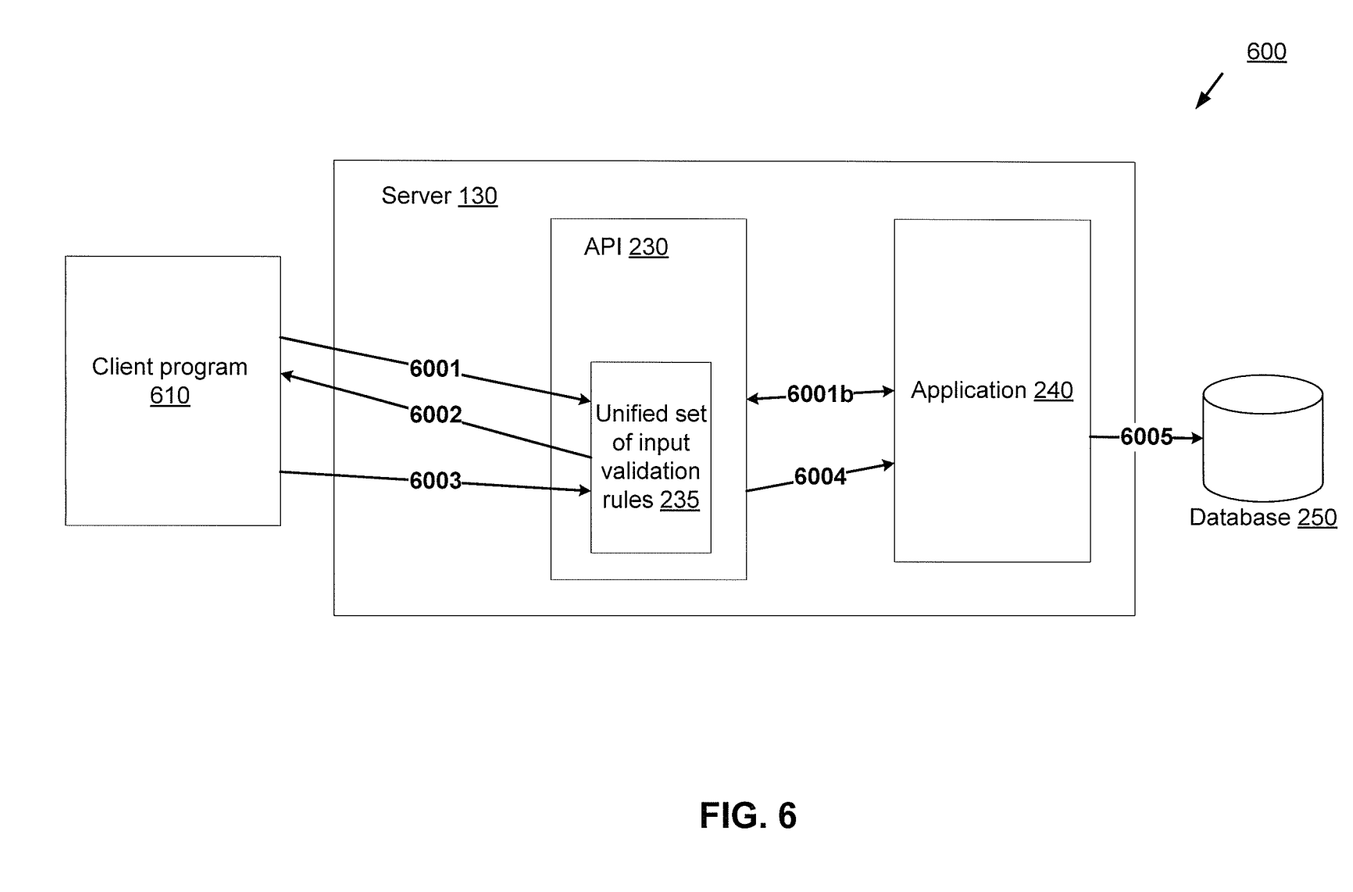
FIG. 6 is a block diagram showing exemplary data communication flows for non-interactive input and validation in the exemplary system of FIG. 2, consistent with embodiments of the present disclosure.

FIG. 6 is a block diagram showing exemplary data flows for non-interactive input and validation in exemplary system 100. Exemplary system 100 can include a client program 610, such as, for example, remote non-interactive program 110 or a local non-interactive program 210 running on server 130.

Server 130 includes API 230 and unified set of input validation rules 235 as described above. API 230 provides an interface to application 240, as described above. Exemplary system 100 may or may not include a database 250. Application 240 can be any program or group of programs that processes input.

In an example of how non-interactive input data can be handled by exemplary system 100, the following events can occur. In order to test the validity of input to system 100, client program 610 provides input values to API 230 (6001). API 230 can then provide information to and obtain information from application 240 (6001b). These input values are evaluated using unified set of input validation rules 235 executed via API 230. If the input values are invalid, an appropriate error can be provided to client program 610 (6002), allowing invalid input to be handled appropriately by client program 610. The API can further provide the tested input. If instead the input values are valid, the input can be provided to application 240 (6004) and then committed to database 250 (6005).

In other exemplary embodiments, client program 610 can obtain default values prior to submitting input to be evaluated by system 100. Client program 610 first calls API 230 to request validation rules and/or default values for each relevant parameter that can be accepted by application 240, as defined in unified set of input validation rules 235 (6001). API 230 can then provide information to and obtain information from application 240 (6001b). API 230 returns validation rules and/or default values (6002).

Next, client program 610 can use the defaults and/or validation rules to filter or process candidate input values, and can submit input to be committed to the system. To commit input, client program 610 can call API 230 to request a commit (6003). The input can be evaluated using any relevant rules from unified set of input validation rules 235, executed via API 230. If determined to be valid, the input can be provided to application 240 (6004) and then committed to database 250 (6005). In some exemplary embodiments, no input will be committed unless all input is determined to be valid. In some exemplary embodiments, input that is valid will be committed, while if the input is determined to be invalid API 230 will return one or more errors. The API can further return the submitted input.

Figure 7:
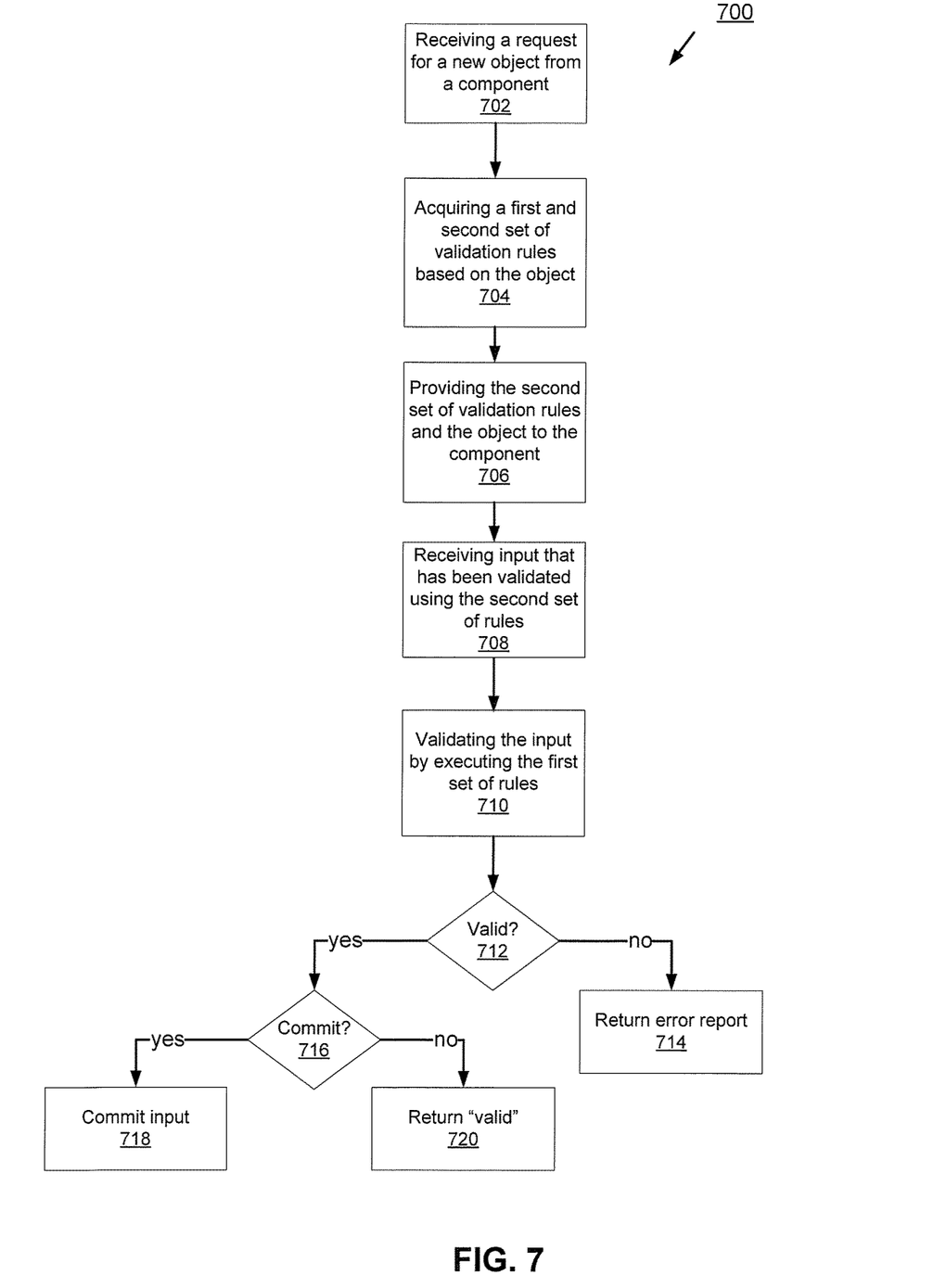
FIG. 7 is a flowchart representing exemplary methods for validating input data acquired through a user interface, consistent with embodiments of the present disclosure.

FIG. 7 is a flowchart representing exemplary methods for validating input data acquired through a user interface 202. Referring to FIG. 7, it will be readily appreciated by one of ordinary skill in the art that the illustrated procedure can be altered to delete steps or further include additional steps. The procedure begins with an API (e.g., API 230) receiving a request for a new object from a component (702), such as HTTP server 220 or remote device 504. For example, a remote device can request access to a user interface, such as a web page, from an HTTP server. After receiving the request from remote device, the HTTP server can access the API using information from that request, such as an identifier for the requested web page, for requesting an object having attributes that can be used to construct the web page.

After receiving the request, the API acquires a first and second set of validation rules associated with the object (704). For example, the API obtains the web page object along with validation rules for each object-relevant parameter that can be accepted by an application (e.g., application 240), as defined in a unified set of input validation rules (e.g., unified set of input validation rules 235). In some embodiments, the information obtained by the API can also include default values. The unified set of input validation rules can include two or more sets of validation rules, where set membership is based in part on where those rules are executed. For example, the unified rule set could include a first set of validation rules where execution of the rules occurs at the API and a second set of validation rules that are validated by a downward component (e.g., HTTP server 220 or remote device 504). In some embodiments, a third set of validation rules are validated by the remaining downward components that did not validate the second set of validation rules. It can be appreciated that any number of sets of validation rules can be associated with an object—for instance, the number of sets of validation rules can correspond to the number of relevant components in the system.

After acquiring the sets of validation rules, the API provides the web page object and the second set of validation rules to the component (706). In some embodiments, the API can additionally provide default values to the requesting component. In some embodiments, the sets of validation rules are methods or attributes of the object. In some embodiments, the API can provide two or more sets of validation rules to the requesting component. In some embodiments, the API can provide all of the sets of validation rules to the downward component. For example, the API could provide a second set of validation rules where execution of the rules occurs at the data server, and a third set of validation rules where execution of the rules occurs at a device that is remote from the requesting component (e.g., HTTP server 220). The second and third set of validation rules can be used to parameterize server validation rules (e.g., server validation rules 520) and/or to generate web page code. For example, in some embodiments, a .Net-based HTTP server can interact with local methods in C# that access the unified set of input validation rules via the API, and use the unified set of input validation rules to parameterize C# implementations of input validation rules that are thus based on and consistent with the unified set of input validation rules. Those C# implementations of the input validation rules can in turn be used to generate JavaScript implementations of the input validation rules (such as remote device validation rules 510) that are embedded in the web page code that will in turn be rendered by a web browser on a remote device. In some embodiments, the default values provided by the API can also be used to parameterize the server validation rules and/or to generate web page code.

Next, the API receives input values from a component, where the input values have been validated using the second set of rules (708) at the downward component. In some embodiments, the API also receives input values that have been validated using the third set of rules. For example, in the case where a third set of rules has been embedded in web page code via a JavaScript implementation of the third set of rules, input values may have been evaluated by executing the third set of rules at the remote device. That is, after receiving the input values, the remote device can evaluate the input values using remote device validation rules. If the input values are valid, the remote device can submit the input values to the server for validation, at which point the second set of rules can be executed in connection with the input.

Next, the API validates the received input values by executing the first set of rules (710). For example, if the only remaining validation rule is to determine whether the input value associated with the username attribute exists in Microsoft Windows' Active Directory, which in this example cannot be performed by other components of the system, the input value will be validated using this rule via a method provided by the API.

Next, the input values are determined to be valid or invalid, as evaluated by the first set of rules (712). If the input values are invalid, the API provides an error report (714). In some embodiments, the API also provides the input values to the calling component.

If instead the input values have been determined to be valid by all applicable rules in the first set of rules, if the system has been asked to commit the values (716), the values will be committed to the system (718). Otherwise, the API will return a result indicating that the input values are valid (720). In some embodiments, the API also returns the input values to the calling component.

Figure 8:
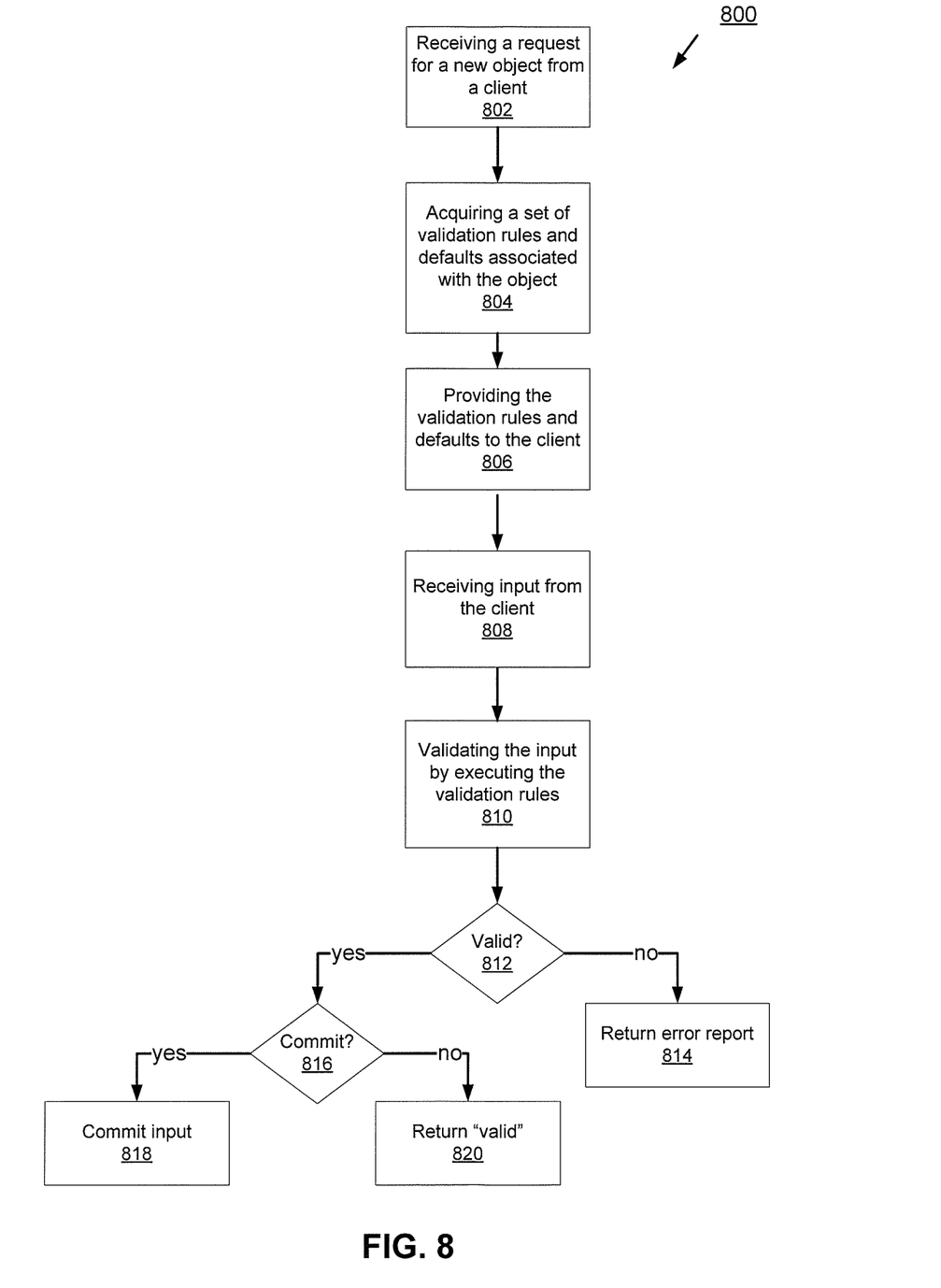
FIG. 8 is a flowchart representing exemplary methods for validating input data acquired through a non-interactive source, consistent with embodiments of the present disclosure.

FIG. 8 is a flowchart representing exemplary methods for validating input data acquired through a non-interactive source. As with FIG. 7, it will be readily appreciated by one of ordinary skill in the art that the illustrated procedure can be altered to delete steps or further include additional steps. The procedure is similar to the interactive source procedure of FIG. 7, except the API interacts with a non-interactive client program as distinguished from a component-specific implementation of validation rules. The procedure begins with an API (e.g., API 230) receiving a request for a new object from a client (802), such as client program 610. For example, the client can request an object having attributes that can be used to create a new user, with contact information attributes and demographic information attributes.

After receiving the request, the API acquires a set of validation rules associated with the object (804). For example, the API obtains a new-user object, along with validation rules for each new-user-relevant parameter that can be accepted by an application (e.g., application 240), as defined in unified set of input validation rules 235. In some embodiments, the information obtained by API 230 can also include default values.

Next, the API provides the validation rules and/or default values to the client (806). The client can use the validation rules and/or default values to ensure that it sends the appropriate data. For example, the client can use the defaults and/or validation rules to filter or process candidate input values, and further to ensure that an action will happen as expected. For example, the client may use the validation rules and/or defaults to generate a detailed error report in case of a failure. The client can then use the detailed error report to modify the candidate input appropriately so that the client can then submit valid input to be committed to the system.

After providing the validation rules, the API receives input values from the client program (808). For example, to commit input, client program 610 can call API 230 to request a commit. In some embodiments, client program 610 can only evaluate input via the API without committing input to the system.

Next, the API validates the input values by executing the object-relevant validation rules (810).

Next, the input values are determined to be valid or invalid, as evaluated by the validation rules associated with the object (812). If the input values are invalid, the API provides an error report (814). In some embodiments, the API also provides the input values to the calling component.

If instead the input values have been determined to be valid by all applicable rules in validation rules associated with the object, if the system has been asked to commit the values (816), the values will be committed to the system (818). Otherwise, the API will return a result indicating the values are valid (820). In some embodiments, the API also returns the input values to the client program.

What is claimed is:

1. A method comprising:
    (a) identifying, by a device responsive to receiving input to be validated and based at least on an object of the input to be validated, a unified rule set for validating the input among a plurality of components, wherein the unified rule set comprises a plurality of sets of input validation rules in which membership for each set of the plurality of sets is based at least on the component of the plurality of components for which an input validation rule is to be executed;
    (b) providing, by the device, a first set of input validation rules of the plurality of sets of input validation rules to a first component of the plurality of components;
    (c) receiving, by the device, one or more input values from the first component that have been validated by the first component using the first set of input validation rules; and
    (d) providing, by the device, the one or more input values and a second set of input validation rules of the plurality of sets of input validation rules, to a second component of the plurality of components to validate the one or more input values.

2. The method of claim 1, further comprising determining that the input is valid responsive to receiving validation of the one or more input values from the second component.

3. The method of claim 1, wherein the first component of the plurality of components comprises an application programming interface (API).

4. The method of claim 1, wherein the second component of the plurality of components comprises a component on a second device in communication with the device.

5. The method of claim 1, wherein each of the plurality of components is implemented using one of a different technology or programming language than another component of the plurality of components.

6. The method of claim 1, wherein (b) further comprises identifying, by the device, the first set of input validation rules for the first component based at least on a type of the first component.

7. The method of claim 1, wherein (d) further comprises identifying, by the device, the second set of input validation rules for the second component based at least on a type of the second component.

8. The method of claim 1, wherein (d) further comprising communicating, by the device, the one or more input values and the second set of input validation rules over a network to the second component.

9. The method of claim 1, wherein (a) further comprises receiving the input from one of a non-interactive source or an interactive source.

10. A system comprising:
   a device comprising one or more processors, coupled to memory and configured to:
   identify, responsive to receiving input to be validated and based at least on an
   object of the input to be validated, a unified rule set for validating the input among a plurality of components, wherein the unified rule set comprises a plurality of sets of input validation rules in which membership for each set of the plurality of sets is based at least on the component of the plurality of components for which an input validation rule is to be executed;
   provide a first set of input validation rules of the plurality of sets of input validation rules to a first component of the plurality of components;
   receive one or more input values from the first component that have been validated by the first component using the first set of input validation rules; and
   provide the one or more input values and a second set of input validation rules of the plurality of sets of input validation rules, to a second component of the plurality of components to validate the one or more input values validated by the first component.

11. The system of claim 10, wherein the device is further configured to determine that the input is valid responsive to receiving validation of the one or more input values from the second component.

12. The system of claim 10, wherein the first component of the plurality of components comprises an application programming interface (API).

13. The system of claim 10, wherein the second component of the plurality of components comprises a component on a second device in communication with the device.

14. The system of claim 10, wherein each of the plurality of components is implemented using one of a different technology or programming language than another component of the plurality of components.

15. The system of claim 10, wherein the device is further configured to identify the first set of input validation rules for the first component based at least on a type of the first component.

16. The system of claim 10, wherein the device is further configured to identify the second set of input validation rules for the second component based at least on a type of the second component.

17. The system of claim 10, wherein the device is further configured to communicate the one or more input values and the second set of input validation rules over a network to the second component.

18. The system of claim 10, wherein the input is received from one of a non-interactive source or an interactive source.

* * * * *